(12) United States Patent
Hannah

(10) Patent No.: US 6,771,704 B1
(45) Date of Patent: Aug. 3, 2004

(54) OBSCURING VIDEO SIGNALS FOR CONDITIONAL ACCESS

(75) Inventor: Eric C. Hannah, Pebble Beach, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/513,625

(22) Filed: Feb. 28, 2000

(51) Int. Cl.$^7$ .............................. H04N 7/12; G06K 9/36
(52) U.S. Cl. ................ 375/240.16; 382/236; 348/416.1
(58) Field of Search ...................... 375/240.16, 240.08, 375/240.1, 240.12, 240.15, 240.24; 708/203; 382/236, 243, 298, 299, 302; 348/413.1, 402.1, 416.1, 445

(56) References Cited

U.S. PATENT DOCUMENTS

| | | | | |
|---|---|---|---|---|
| 5,418,571 A | * | 5/1995 | Ghanbari ............... | 375/240.16 |
| 5,742,343 A | * | 4/1998 | Haskell et al. ......... | 375/240.15 |
| 5,988,863 A | * | 11/1999 | Demos ................... | 708/203 |
| 6,275,531 B1 | * | 8/2001 | Li ........................ | 375/240.12 |
| 6,292,512 B1 | * | 9/2001 | Radha et al. ............ | 375/240.1 |
| 6,330,280 B1 | * | 12/2001 | Suzuki et al. ........... | 375/240.08 |
| 6,339,618 B1 | * | 1/2002 | Puri et al. ............... | 375/240.16 |
| 6,493,390 B2 | * | 12/2002 | Mayaji et al. ........... | 375/240.16 |
| 6,577,682 B1 | * | 6/2003 | Brightwell et al. ..... | 375/240.24 |

* cited by examiner

*Primary Examiner*—Gims Philippe
(74) *Attorney, Agent, or Firm*—Trop, Pruner & Hu, P.C.

(57) ABSTRACT

A video data stream is re-encoded using motion vectors from a prior encoding operation. The video data may be enhanced by the system. Information about the enhancement, along with the decoded motion vectors, is sent to encoding circuitry. Information provided to the encoder may be tailored to the type of video data received or to the type of enhancement performed, or based on other criteria. Using the previously derived motion vectors, the encoding circuitry may perform substantially fewer computations than are used to calculate motion vectors from scratch

20 Claims, 6 Drawing Sheets

OBSCURING VIDEO SIGNALS FOR CONDITIONAL ACCESS

BACKGROUND

This invention relates to compressed data transmissions and, more particularly, to the decoding and encoding of data streams.

Multimedia, a combination of audio, video, still pictures, and text, is increasingly available to consumers worldwide. Multimedia content may be received by a computer connected to a network or by a television set connected to a cable wire, a satellite dish, or an antenna, as just a few examples.

Particularly because of the video content, multimedia data streams are typically compressed (or encoded) prior to transmission, then decompressed (or decoded) at a receiver. By one measure, a single second of uncompressed, broadcast quality video data may be represented using 270 Mbits. Transmission bandwidth and storage limitations make data compression a sensible choice for most applications.

One of the features of video compression is motion estimation. Motion estimation predicts where an object on a video frame will be, based upon the l,position of the object in a prior video frame. This repetition of images between frames "is known as temporal redundancy. Motion estimation exploits temporal redundancy by storing a motion vector to represent the position of an object relative to its position in a prior video frame. Using motion vectors, the bits used to represent the object may, in essence, be reused for each subsequent frame which includes the object.

Although effective in reducing the number of bits to be transmitted or stored, motion estimation is very computationally intensive, and thus, expensive. Although algorithms for "intelligent prediction" may reduce the cost of motion estimation, this aspect of video compression nevertheless remains an expensive part of the encoding process.

Increasingly, data streams such as multimedia content may, be manipulated down the pipeline before being received by the intended site. For example, a set-top box may re-format a data stream in some way before sending the data to a television. In order to "add value" to the multimedia content, the receiver thus may decode the data stream, make the desired changes to the video stream, and re-encode the data stream before sending to the site.

To encode the newly changed video stream, a new set of motion vectors may be calculated. However, particularly for some low-cost receiver/encoders, the capability to perform computationally intensive motion estimation may be limited Thus, there is a continuing need to provide a low-cost system for decoding and encoding a data stream.

DETAILED DESCRIPTION

Although television sets and computers may receive multimedia content, set-top boxes are also available as multimedia receivers. Set-top boxes" are processor-based systems that work with a display such as a television set. The set-top box typically includes a decoder to decompress the streamed multimedia content before sending the content to the television display.

In addition to decoding the multimedia, the set-top box may add features to the incoming multimedia stream. For example, set-top box manufacturers may add graphical overlays to the video content, or may re-scale the video content or otherwise re-segment how the original video content is viewed on the television. In this: context, the set-top box may be thought of as an "enhancement receiver."

To add features to an incoming video stream, the enhancement receiver may decode the video stream, reproducing a sequence of video frames. Enhancements such as graphical overlays may then be added to each frame, as one example. Or, the video frames may be down-scaled in size, such that additional information is added to each frame, as another example.

Regardless of the particular enhancements made, the resulting video frames may be transmitted to a display for viewing. When the display device is not connected directly to the enhancement receiver (i.e., the display is remote from the receiver), the video frames may be re-encoded prior to transmission. Accordingly, the enhancement receiver may include both decoding and re-encoding circuitry together.

Figure 1:
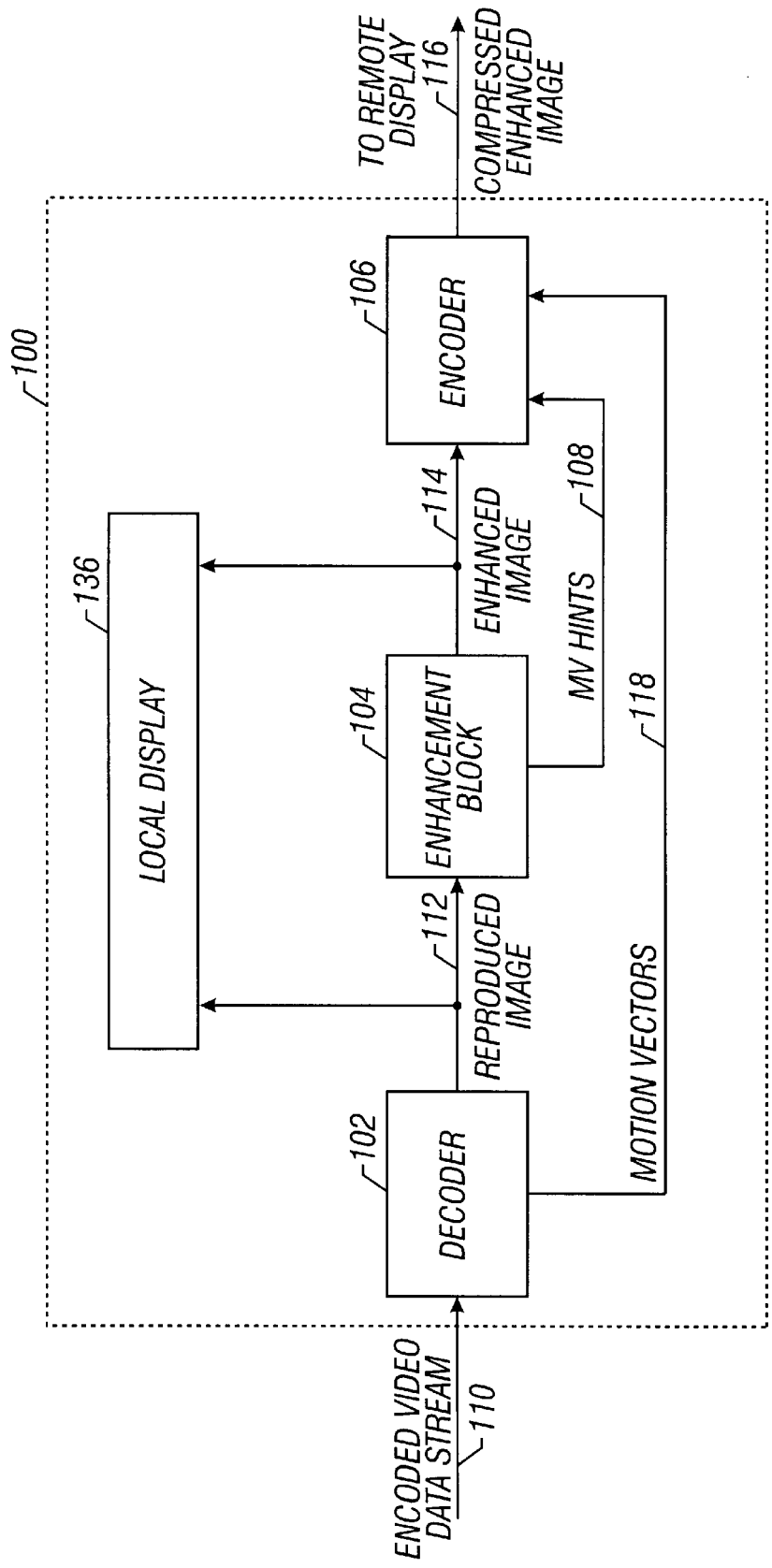
FIG. 1 is a block diagram of a system according to one embodiment of the invention.

In FIG. 1, a system 100, such as an enhancement receiver, includes a decoder 102, an enhancement block 104, and an encoder 106, according to one embodiment of the invention. The decoder 102 receives an encoded video data stream 110, such as one received from a remote transmission site (not shown). The system 100 may be a set-top box, for example, which may decode the encoded video data stream 110 before sending it to a local display 136, such as a television set.

The decoder 102 may decompress the video data stream 110, resulting in a reproduced image stream 112. The reproduced image 112 may then be sent to the local display 136 connected to the system 100. Because the display 136 is local, the reproduced image stream 112 is not re-encoded before being sent.

The reproduced image 112 may be manipulated in some manner by the system 100. Accordingly, in FIG. 1, the enhancement block 104 may receive the decompressed image 112 in order to add graphic overlays to the image 112, re-size the image 112, such as for "picture within a picture" enhancements, or perform any one of a variety of other modifications. One or more of these operations may produce an enhanced image 114.

In addition to generating the reproduced image 112, the decoder 102 also extracts a plurality of motion vectors 118. The motion vectors 118, created at the remote transmission site during the encoding process, are embedded into the encoded video data stream 110. The motion vectors 118 include information about the relative positions of image objects between frames of the video image. According to one embodiment of the invention, the motions vectors 118 are sent from the decoder 102 to the encoder 106.

Once the enhanced image 114 is generated, the enhancement block 104 may send the image 114 to the encoder 106.

The enhanced image 114 may thus be encoded for receipt by a remote display (not shown). Additionally, the enhanced image 114 may be sent directly to the local display 136 if desired.

For remote transmission of the enhanced image 114, the encoder 106 further receives a plurality of motion vector hints 108 from the enhancement block 104, according to one embodiment of the invention. The motion vector hints 108 are essentially information about the enhancement made to the reproduced image 112. By using the motion vectors 118 with the motion vector hints 108, the encoder 106 is provided with a "starting point" for generating new motion vectors and, thus, compressing the enhanced image 114. Thus, the encoder 106 may produce a compressed enhanced image 116, to be transmitted to a remote display (not shown).

Motion vectors are produced during a compression technique known as motion estimation. Motion estimation is but one of several techniques which may be employed to compress an image. The following discusses several compression techniques which are typically employed under the MPEG-2 compression standard. However, the described embodiments may be practiced under other compression standards without departing from the spiriting of the invention.

The Moving Pictures Experts Group, known as MPEG, was established in 1988 to develop a standard for the compression of both video and audio data streams. The MPEG-2 standard was defined in 1990 to support television applications including broadcast transmissions. MPEG-2 refers to International Organization for Standardization (ISO) and International Electrotechnical Commission (IEC) Standard 13818-1 (systems), 13818-2 (video), 13818-3 (audio) and 13818-4 (compliance) (1994).

Under the guidance of the MPEG-2 standard, several tech piques for performing video compression are widely employed. For each technique used during the encoding process, a corresponding inverse technique may be used during decoding of the image.

One procedure used with image compression is known as discrete cosine transform (DCT). A DCT operation may be performed upon portions, called blocks, of each video frame. Because the human eye is insensitive to high, frequencies in color changes, storing the real color values for each block may be inefficient. Using DCT, a set of frequency coefficients, describing color transitions in the block, replaces the real color values for each block. For each block, the frequency coefficients may be represented using fewer bits than the original image.

Another frequently used compression operation is quantization. The coefficients created during the DCT operation are typically quantized, or converted into values which may be represented using fewer bits. Some loss of information usually occurs during this process, which is why MPEG-2 is known as a "lossy" compression technique. The quantization method may be adjusted, depending on the image, to minimize the amount of information lost during quantization.

Variable length coding is another procedure commonly employed during MPEG compression. Essentially, bit patterns which occur frequently are replaced with codes of shorter length, reducing the total number of bits to be transmitted.

Another compression technique, motion estimation, may be performed to compress video images. By one measure, motion estimation represents about 90% of the cost, both in terms of time and computing power, of the entire compression operation. Motion estimation identifies objects in a video frame which were also present in a prior video frame. This temporal redundancy is exploited by storing, where possible, the relative position of an object in a video frame rather than the bitmap representation of the object itself.

Figure 2:
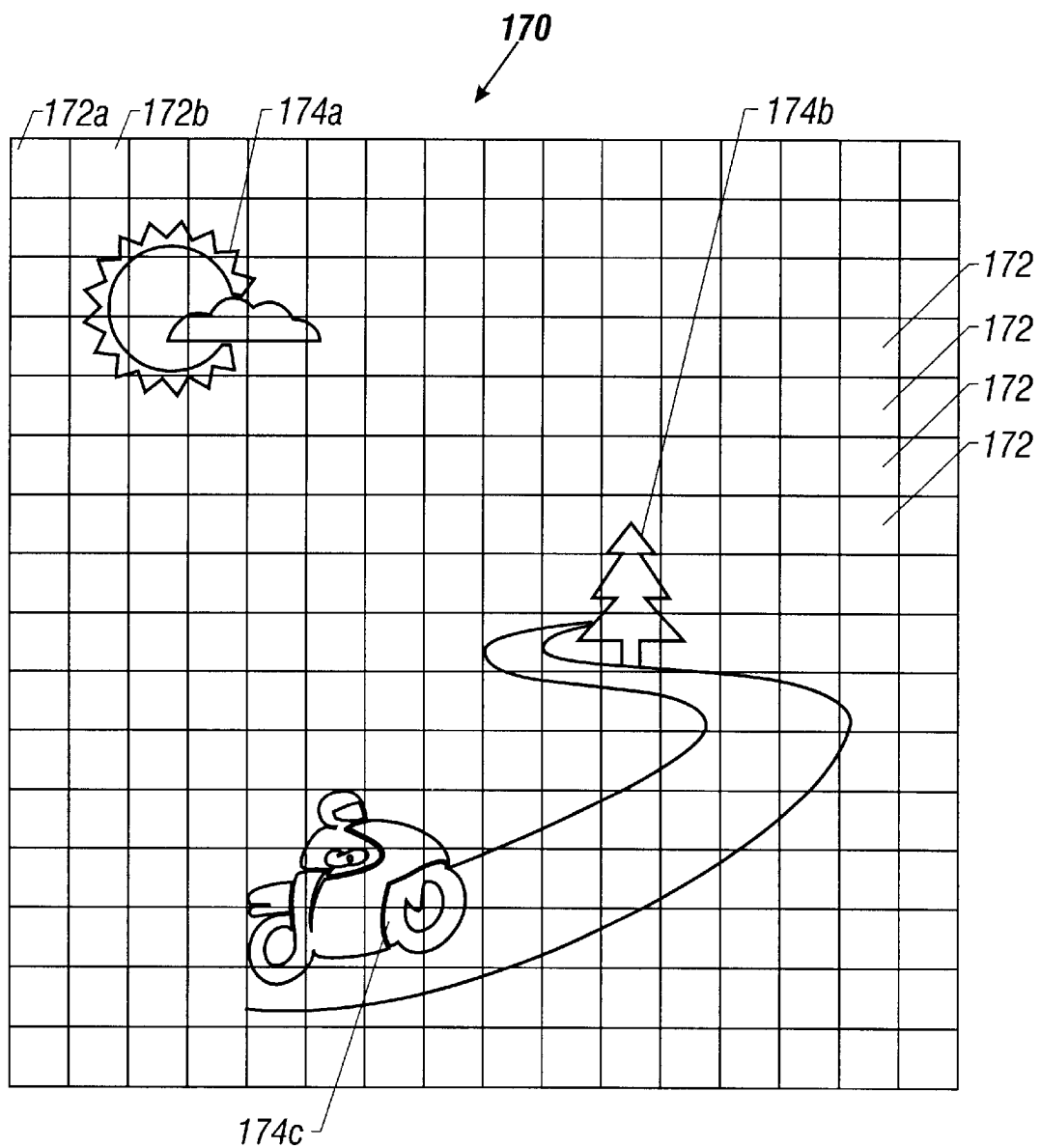
FIG. 2 is a diagram of a frame according to one embodiment of the invention.

In FIG. 2, a video frame 170 is one of a plurality of video frames as part of a video data stream. Three objects, a sun-and-cloud 174$a$, a tree 174$b$ and motorcyclist 174$c$, make up the imagery of the video frame 170.

Typically, the video frame 170 is divided into macroblocks 172. Compression operations, including motion estimation, may be performed on each macroblock 172. Each macroblock 172 is typically further subdivided into multiple blocks of eight-by-eight pixels each. The blocks separately specify the luminance and chrominance information about the macroblock 172. The number of blocks in a macroblock 172 may vary, depending on the sampling format used to digitize the video image.

The macroblocks 172 are used to build the video image. Each macroblock 172, including blocks containing luminance and chrominance values, is encoded before being transmitted. In encoding each macroblock 172, any redundancies discovered between macroblocks are exploited. Thus, while the macroblock 172$a$ may be encoded as "all white pixels," for example, the macroblock 172$b$ may be encoded as "identical to macroblock 172$a$." The redundant macroblock 172$b$ may thus be encoded using substantially fewer pixels. In the frame 170 of FIG. 2, over one hundred macroblocks (those including only white pixels) would be encoded in this abbreviated fashion.

In addition to identifying identical macroblocks within a frame 170, the redundancy between frames is exploited during compression of a video image. This is where motion estimation may be used. In the frame 170 of FIG. 2, it is likely that the tree image 174$b$ will remain in the same position in successive frames. This means that the tree object 174$b$ may be found in the same set of macroblocks in subsequent frames. Rather than encoding each identical macroblocks in successive frames from scratch, a reference to a single encoded frame may be stored in all frames which include the tree image 174$b$.

In contrast, the motorcyclist object 174$c$ is likely to move to a different set of macroblocks in successive frames of the image. Using motion estimation, a macroblock 172 of a video frame 170 may be compared to macroblocks 172 in both previous frames and subsequent frames, looking for a matching image, such as the motorcyclist object 174$c$. Once found, a representation of the movement of the object, known as motion vector, may be stored in lieu of a complete representation of the motorcyclist object 174$c$.

Figure 3:
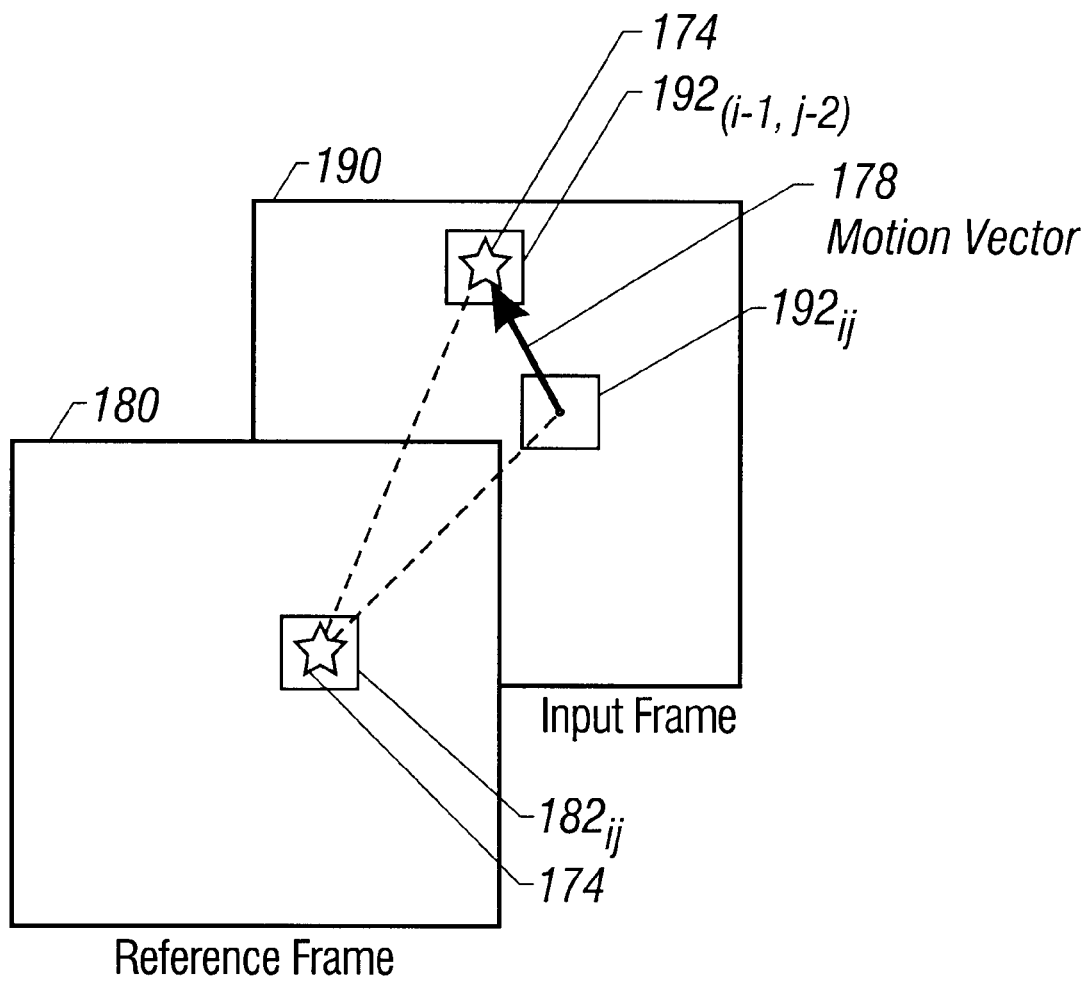
FIG. 3 is an illustration of a motion vector according to one embodiment of the invention.

In FIG. 3, a reference frame 180 is comprised of i×j macroblocks. An object 174 is shown inside the macroblock 182$_{ij}$. An input frame 190 is also composed of i×j macroblocks. The input frame 190 also includes the object 174. However, the object 174 is not located inside the macroblock 192$_{ij}$, corresponding to macroblock 182$_{ij}$ in the reference frame 180. Instead, the object 174 is located inside the macroblock 192$_{(i-1, j-2)}$.

One motion estimation technique is known as block matching. In FIG. 3, the macroblock 182$_{ij}$ is compared, a pixel at a time, with a similarly sized macroblock 192$_{ij}$. If there is no motion between the reference frame 180 and the input frame 190, there will be high correlation between the pixel values. However, in the case of motion, the same, or similar pixel values, will be elsewhere. Accordingly, to search for the pixel values, the search block may need to be moved to different locations within the input frame 190. The location which gives the best correlation is assumed to be the new location of the moving object 174.

Although conceptually simple, an enormous amount of computation power is used during block matching because every possible motion is tested over the assumed range. Thus, for example, if the objection 174 has moved in any direction by sixteen pixels or less, the object 174 may be located in one of sixty-five thousand different locations. At each position, every pixel in the macroblock $182_{ij}$ is compared with every one of sixty-four thousand pixels in the input frame 190.

Whether by block matching or some other technique, to perform motion estimation, the input frame 190 is searched until the object 174 is found. In FIG. 3, a motion vector 178 represents the movement of the object 174 from the macroblock $182_{ij}$ position to the macroblock $192_{(i-1,j-2)}$ position. Once the object 174 has been found in the input frame 190, the motion vector 178 may be calculated and the input frame 190 may be encoded using the motion vector 174, without having to store a bit-by-bit representation of the object 174.

Because motion estimation is very computationally intensive, the processing power, the clock speed, and the available memory used to conduct motion estimation may be costly for some environments. Conventionally, relatively sophisticated equipment may be used at the data source to encode video data according to the MPEG-2 standard. The data source may include service providers such as studios or other producers that create material including DVD (digital video disc) movies, digital cable programming and programming for terrestrial transmission of HDTV (high definition television). Such sophisticated equipment may provide higher quality video with the relatively high cost effectively spread over viewers and consumers of the produced video data. Consequently, more accurate motion detection may be incorporated into the source video data (such as MPEG-2 data) than may be expected from consumer devices at the receiving end.

Although receivers may typically be more limited in their hardware capability than the transmitters at the data source, some receivers may nevertheless include hardware to encode a video data stream. Applications for re-encoding a data stream are emerging.

For example, some digital televisions may receiver over-the-air MPEG-2 transmissions. The data may be transmitted by digital modulation of standard TV carrier radio waves that were received by an antenna connected to a receiver. The manufacturers of receivers such as set-top boxes may want to re-broadcast cable and satellite MPEG-2 transmissions inside the home to these digital televisions without the need for a cable connection.

Further, some set-top box manufacturers may add graphical overlays to the transport stream or to re-scale or re-segment how the original MPEG-2 content is seen on the remote digital display. Such additions permit value-added services and capabilities to be presented through the digital television.

The system 100 of FIG. 1 provides the capability for receipt of a video data stream, modification to the data stream, and re-encoding of the video data stream, for transmission to a remote display. Further, in some embodiments of the invention, the system 100 may effectively re-encode the enhanced video data stream without excessively expensive hardware for performing motion estimation during compression.

Instead, according to one embodiment of the invention, the system 100 of FIG. 1 uses the motion vectors already created at the transmission site to generate new motion vectors. An enhanced image may thus be compressed with less computation. Where possible, the compressed image, complete with enhancements generated by the system 100, may then be broadcast to a remote site.

Figure 4:
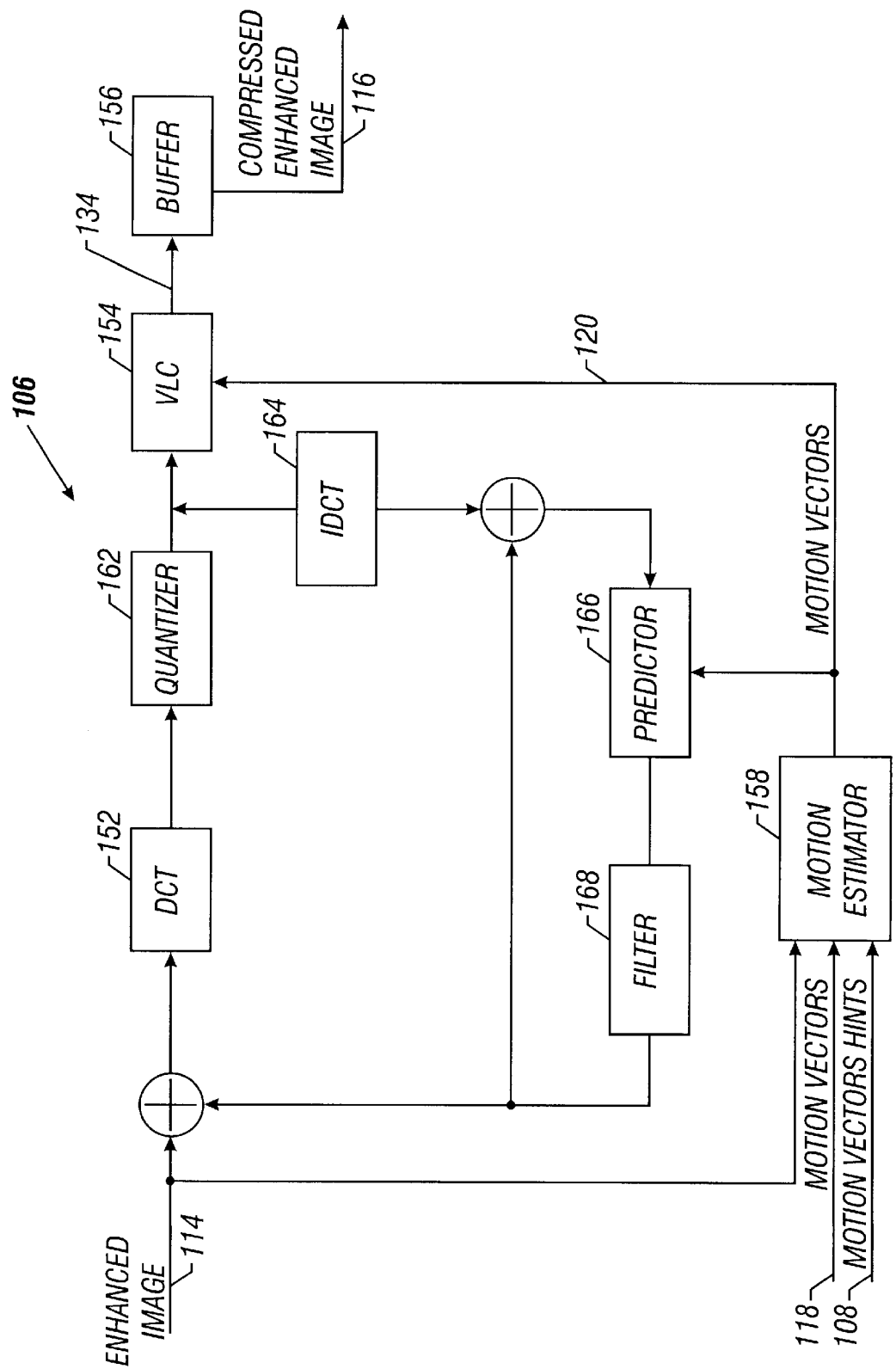
FIG. 4 is a block diagram of an encoder according to one embodiment of the invention.

In FIG. 4, the encoder 106 of FIG. 1 includes a motion estimator 158 in one embodiment of the invention, for performing motion estimation of objects 174, inside each frame 170. For each macroblock, the motion estimator 158 receives the motion vectors 118 from the decoder 102 as well as the motion vector hints 108 from the enhancement block 104 (FIG. 1). Using this information, along with the enhanced image 114, the motion estimator 158 may produce a plurality of new motion vectors 120.

The encoder 106 further includes circuitry for performing m!any of the operations described above. For example, a DCT block 152, a quantizer 162, and a variable length coder 154, are all featured as part of the encoder 106.

The motion vector hints 108 assist the motion estimator 158 in determining how changes may be made to the motion vectors 118. These hints 108 may be derived from the type of operation performed by the enhancement block 104 (FIG. 1) as well as from general vector field principles.

A vector field is a two-dimensional collection of vectors, often shown as a grid of arrows, each arrow having a unique length and direction. Vector, field continuity is the principle that, in some circumstances, a large portion of the two-dimensional array of motion vectors point in the same direction and have the same length as neighboring motion vectors.

Camera panning demonstrates vector field continuity well. When a camera pans, the resulting motion estimation motion vectors are typically all the same length. Further the motion vectors are pointing in a direction opposite to the panning direction of the camera. Thus, where a camera pans, vector field continuity may be used in deriving motion vector hints 108. By contrast, for a video image of people or objects moving about randomly, vector field continuity may not apply, except where a macroblock encloses a single object or person.

Vector field interpolation is another principle from which motion vector hints 108 may be derived. According to vector field interpolation, after creating a "coarse" vector field from a video image, the missing "fine" vectors in between the coarse vectors may be predicted by averaging the neighboring vectors. In one embodiment of the invention, vector field interpolation is used prior to performing exhaustive motion estimation searching.

For example, if a video frame is scaled down, the motion vectors from the unscaled video frame will be wrong. However, the coarse motion vectors may be fitted over the new macroblocks as a starting point for motion estimation. The coarse motion vectors may thus be provided to the motion estimator 158 as motion vector hints 108.

In a video image where simple offsets to the video image are added, the bulk of the motion vectors 118 may remain unaffected. If a video image is translated, such as by adding a graphics overlay to the video image, then, upon creating the enhanced image 114, the enhancement block may produce a two-dimensional vector, $U_{graphic}$, for the graphics overlay as the motion vector hint 108. Thus, for each macroblock of the enhanced image 114, the motion estimator 158 adds the motion vector hint 108, $U_{graphic}$, to the original motion vector 118, $V_{in}$, to produce a new motion vector, $V_{out}$. This new value, $V_{out}$, represents a starting point for performing motion estimation on the enhanced image 114.

Where the video image is scaled up or down in resolution, vector field interpolation may be used to compute new motion vectors so that the motion vectors 118 fit the new resolution of the macroblock. For example, for a video frame 170 which is reduced to 25% of its original size, objects 174 in the reduced video frame may not be located in the macroblocks corresponding with the original frame 170. Further, block matching will fail because the object size is reduced. Vector field interpolation provides a starting point for performing motion estimation.

Using these principles, a successful estimate for the motion vector of one object may simplify the derivation of all other object motion vectors in a frame. Upon arriving at a new motion vector, a local search of the enhanced video frame may be performed to further optimize the motion vectors.

By using the motion vector hints 108 provided by the enhancement circuitry 104, the encoder 106 may therefore calculate new motion vectors 120 without having to "start from scratch." Particularly for systems 100 which perform the same enhancement on a number of video frames, or for systems 100 which provide relatively simple enhancements, the re-encoding of an enhanced video data stream may thus be substantially simplified.

Alternatively, in one embodiment of the invention, the encoder 106 may receive the enhanced image 114 and the reproduced image 112. From the two images, the encoder 106 may derive the motion vector hints 108, based upon a comparison between the images 112 and 114. For example, if the enhanced image 114 includes a graphics overlay image, a subtraction of the reproduced image 112 from the enhanced image 114 will produce the graphics overlay image. From this information, the encoder 106 may derive motion vector hints 108, such that the new motion vectors 120 may be derived.

Video frames which include graphics-only elements May present distinct challenges. Since graphic elements are usually created by means of high-level display lists of commands, the motion vector hints 108 may include data structures for handling movement of the graphics elements. For example, in one embodiment of the invention, text which is scrolled upwards is accompanied by a data structure of motion vector hints 108 containing an upward pointing vector field of the correct magnitude.

In another embodiment of the invention, for three-dimensional graphics, objects are supplemented with motion vectors projected onto the screen coordinate system. Regardless of the particular type of motion vector hints 108 employed, the motion estimator 158 may additionally perform a local search, for "fine tuning" of the motion vector. As with traditional video, the motion vector hints 108 for, graphic-only images provide the motion estimator with a "head start" for determining the correct location of an object in the video frame 170.

In yet another embodiment of the invention, where mixed video and graphics macroblocks 172 are found in the video frame 170, the individually computed new motion vectors 120 for each may be averaged to arrive at a good starting point for guessing a motion vector for the combined image.

A variety of other algorithms may be employed for creating new motion vectors. These algorithms may be derived from the type of video input, the type of operation performed upon the video input and other factors. The encoder 106 is thus able to simplify the motion estimation process by receiving the prior motion vectors 118 and the motion vector hints 108 from the enhancement block 104, to arrive, a new motion vectors 120.

Looking back to FIG. 4, the new motion vectors 120 are received by the variable-length coder 154, along with the partially compressed enhanced image 114, for further compression as bit stream 134. The bit stream 134 is then received by the buffer 156, and sent out of the encoder 106 as the compressed enhanced image 116.

Figure 5:
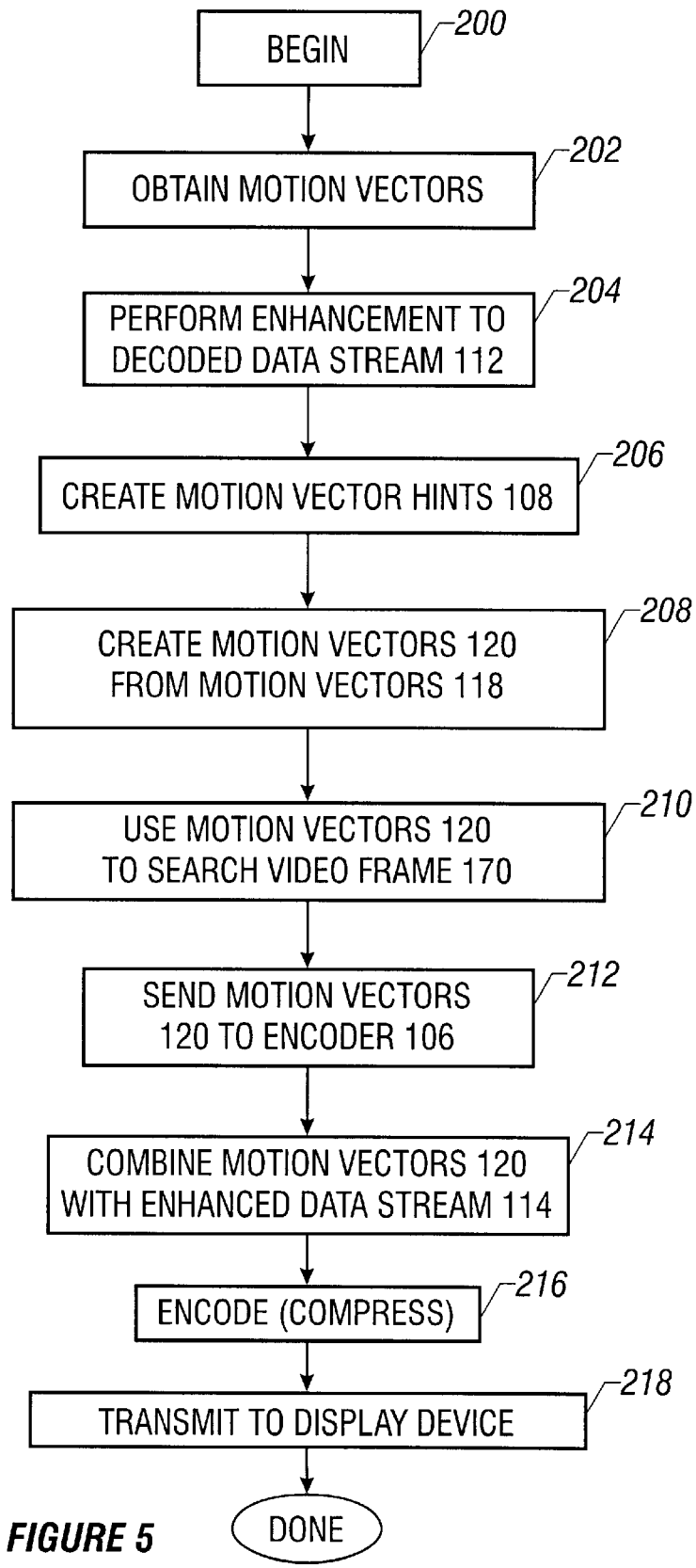
FIG. 5 is a flow diagram illustrating the encoding of enhanced video using preexisting motion vectors according to one embodiment of the invention.

In FIG. 5, a flow diagram illustrates the operation of the system 100 according to one embodiment of the invention. A content portion and a first motion vector portion may be developed from a video frame. The motion vectors 118 are saved as result of the operation of the decoder 102 (block 202). From the reproduced image 112, the enhancement block 104 may perform a modification operation, such as an operation to enhance the decoded data stream 112 (block 204). A plurality of motion vector hints 108 may be created for the particular enhancements (block 206).

The system 100 may next create a modified motion vector portion from the first motion vector portion based upon the modification operation. For instance, the system 100 may perform an operation on the plurality of motion vectors 118, based upon the motion vector hints 108 to arrive at a second motion vector portion. A plurality of new motion vectors 120 is thus created (block 208). The new motion vectors 120 may be a "starting point" for determining what the actual motion vectors, or the modified motion vector portion, for the enhanced image 114 should be. Accordingly, to test the new motion vectors 120, a quick local search of the video frame 170 may be conducted, using the new motion vectors 120 (block 210). This operation may be repeated as needed, with the new motion vectors 120 being updated each time the local search is performed.

Upon completion of the local search, a plurality of new motion vectors 120 may be sent to the encoder 106 (block 212). There, the new motion vectors 120 are combined with the enhanced data stream 114 (block 214) to form a third video stream. The encoder 106 may then compress the enhanced data stream 114 as well as the newly created new motion vectors 120 (block 216) to encode the third video stream. The enhanced compressed image 116 may thus be transmitted to a remote display device (block 218). The operation is thus complete.

Figure 6:
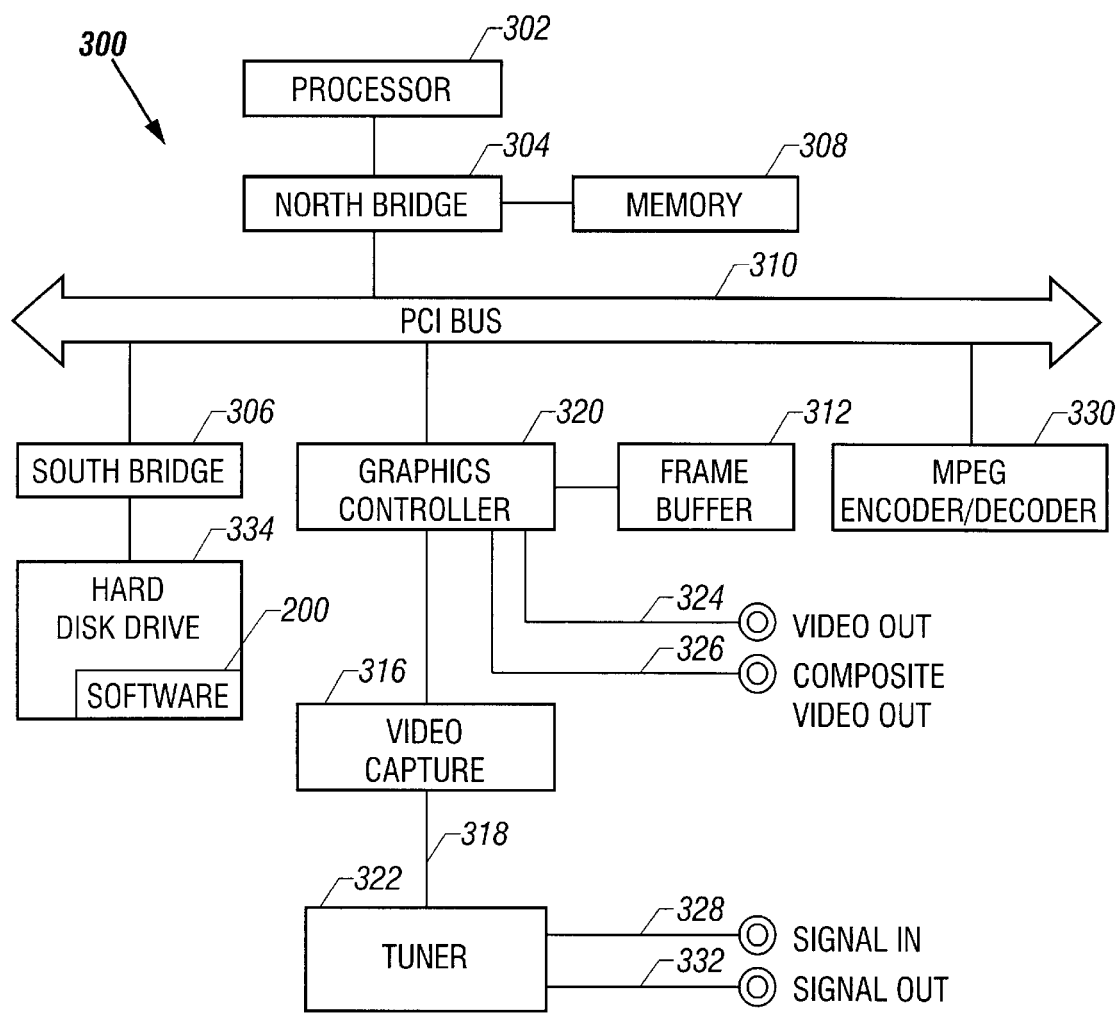
FIG. 6 is a block diagram of a set-top box employing the features of FIG. 5 according to one embodiment of the invention.

In FIG. 6, a processor-based system 300, such as a set-top box, performs the operations of FIG. 5. The system 300 includes a processor 302 (e.g., an x86 or Pentium® family processor from Intel Corporation) coupled to a north bridge 304. The north bridge 304 couples the processor 302 to a bus 310, such as a peripheral component interconnect (PCI) bus. See PCI Local Bus Specification, Rev. 2.1, Jun. 1, 1995, available from the PCI Special Interest Group, Portland, Oreg. 97214.

The north bridge 304 is further coupled to a memory 308. In one embodiment of the invention, the enhancement block 104 is part of a software program 200 (FIG. 5) which may be loaded into the memory 308. The system memory 308 may comprise dynamic random access memory (DRAM), synchronous DRAM (SDRAM), and so forth.

The PCI bus 310 is coupled to a south bridge 306. The south bridge 306 may provide an interface, such as to a hard disk drive 334, or the south bridge may act as a bridge between the PCI bus 310 and a second bus (not show). The software program 200, as illustrated in FIG. 5, may be stored on the hard disk drive 334.

The PCI bus is further connected to a graphic controller 320. The graphics controller includes a frame buffer 312, which may be used to store video frames, for example. The graphics controller 320 may transmit an incoming data stream through a high quality S-video out port 324 or though a composite video out port 326. These ports 324 or 326 may be used for connecting the system 300 to a display, such as a television set.

The system 300 further includes a tuner 322 and a video capture device 316, according to one embodiment of the invention. The tuner 322 and the video capture card 316 may be combined as a single device in other embodiments.

In one embodiment of the invention, the tuner 322 receives a video signal from a signal in port 328. The signal may then be sent to the video capture module 316. The video capture module 316 sends the signal to the graphic controller 314. A signal out port 332 may be used to connect to a second device, such as a video cassette recorder.

Also connected to the PCI bus 310 is an MPEG encoder/decoder 330. The MPEG encoder/decoder 330 may assist the software program 200 in performing the operations described in the flow diagram of FIG. 5.

Thus, a system for performing re-coding of video data streams uses previously calculated motion vectors as a starting point for calculating new motion vectors. The system, upon enhancing the decoded video image, may pass those enhancements onto the encoder, such that new motion vectors may be derived, based upon the enhancements. In some embodiments, the motion vectors may be created without performing excessive calculations. In some embodiments, the encoder may arrive at a new motion vector based upon the type of image. The system may be used in receivers, such as set-top boxes, without expensive hardware, such that enhancements to a video data stream may be performed and then transmitted remotely from the set-top box in some embodiments. Other embodiments with other advantages may be derived from the embodiments described herein.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method comprising:
   decoding a compressed video stream to generate a decoded content portion and a first motion vector portion;
   modifying the decoded content portion; and
   encoding the decoded, modified content portion using the first motion vector and information about how the content portion was modified.

2. The method of claim 1 wherein modifying the decoded content portion includes adding graphic overlays and resizing the image.

3. The method of claim 1 including receiving compressed television content, decompressing the compressed television content, enhancing the decompressed television content, and encoding the enhanced television content using information derived from decoding the information and information about how the content was enhanced.

4. The method of claim 1 further comprising:
   modifying the first motion vector into a modified motion vector portion based upon the modified, decoded content portion.

5. The method of claim 4 further comprising:
   combining the modified, decoded content portion with the modified motion vector portion to form a video stream; and
   encoding the video stream.

6. The method of claim 1, wherein modifying the first motion vector further comprises:
   receiving a modification operation;
   deriving a second operation from the modification operation; and
   performing the second operation on the first motion vector portion to arrive at a second motion vector portion.

7. The method of claim 6, further comprising:
   testing the modified motion vector portion; and
   adjusting the modified motion vector portion as a result of the testing.

8. The method of claim 5, further comprising:
   developing a video image from the video stream.

9. The method of claim 5, further comprising:
   developing a graphic from the video stream.

10. The method of claim 9, further comprising:
    performing a scrolling operation on the decoded content portion.

11. A system comprising:
    a decoder to decode a compressed video stream to generate a decoded content portion and a first motion vector portion;
    a controller coupled to modify the decoded content portion; and
    an encoder coupled to said controller to encode the decoded, modified content portion using the first motion vector and information about how the content portion was modified.

12. The system of claim 11, further comprising:
    a memory storing the first motion vector portion and the information about how the content portion was modified; and
    an enhancer to perform enhancement operations on the decoded content portion.

13. The system of claim 12, wherein the enhancement operation is a size reduction of the decoded content portion.

14. The system of claim 12, wherein the enhancement operation is an addition of a graphic overlay pattern on the decoded content portion.

15. The system of claim 12, wherein the enhancement operation is a scrolling operation performed upon the decoded content portion.

16. An article comprising a medium storing instructions that when executed caused a processor-based system to:
    decode a compressed video stream to generate a decoded content portion and a first motion vector portion;
    modify the decoded content portion; and
    encode the decoded, modified content portion using the first motion vector and information about how the content portion was modified.

17. The article of claim 16 comprising a medium storing instructions that when executed cause a processor-based system to add graphic overlays and resize the image.

18. The article of claim 16 comprising a medium storing instructions that when executed case a processor-based system to:
    receive compressed television content, decompress the compressed television content, enhance the decompressed television content, and encode the enhanced television content using information derived from decoding the information and information about how the content was enhanced.

19. The article of claim 16 comprising a medium storing instructions that when executed case a processor-based system to:

modify the first motion vector into a modified motion vector into a modified motion vector portion based upon the modified, decoded content portion.

20. The article of claim 19 comprising a medium storing instructions that when executed case a processor-based system to:

combine the modified decoded content portion with the modified motion vector portion to form a video stream; and encode the video stream.

* * * * *